(12) United States Patent
Ishida

(10) Patent No.: US 6,441,104 B1
(45) Date of Patent: Aug. 27, 2002

(54) PROCESS FOR PRODUCING HIGH MOLECULAR WEIGHT THERMOPLASTIC RESIN COMPOSITION AND ITS USE

(75) Inventor: Hiroyuki Ishida, Suita (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/593,689

(22) Filed: Jun. 14, 2000

(30) Foreign Application Priority Data

Jun. 16, 1999 (JP) ............................................ 11-169946

(51) Int. Cl.[7] .......................... C08G 2/32; C08G 63/91; C08G 65/48; C08G 69/48; C08G 69/42
(52) U.S. Cl. ...................... 525/437; 525/397; 525/400; 525/420; 525/462; 525/472; 525/537
(58) Field of Search ................................ 525/437, 397, 525/400, 420, 462, 472, 537

(56) References Cited

U.S. PATENT DOCUMENTS

| | | | |
|---|---|---|---|
| 3,553,157 A | 1/1971 | Dijkstra et al. | ................ 260/40 |
| 4,145,466 A | 3/1979 | Leslie et al. | .................. 428/35 |
| 4,176,101 A | 11/1979 | Leslie et al. | .............. 260/22 T |
| 4,725,291 A * | 2/1988 | Ueoka | ........................... 55/82 |

FOREIGN PATENT DOCUMENTS

| | | |
|---|---|---|
| EP | 0422282 | 4/1991 |
| EP | 0870525 | 10/1998 |
| FR | 2401945 | 3/1979 |
| GB | 1239751 | 7/1971 |
| JP | 4713860 | 4/1972 |
| JP | 5507523 | 10/1993 |
| JP | 686518 | 11/1994 |
| JP | 859668 | 3/1996 |
| JP | 08059668 | * 3/1996 |
| JP | 10265474 | 10/1998 |
| JP | 10279522 | 10/1998 |
| WO | 9105815 | 5/1991 |
| WO | 9217520 | 10/1992 |

\* cited by examiner

*Primary Examiner*—Patricia A. Short
(74) *Attorney, Agent, or Firm*—Roylance, Abrams, Berdo & Goodman, L.L.P.

(57) ABSTRACT

The present invention provides: a process for producing a high molecular weight thermoplastic resin composition, which can give the high molecular weight thermoplastic resin composition with good reproducibility and stably; and uses of the resultant resin composition. The process for producing a high molecular weight thermoplastic resin composition comprises the step of mixing a thermoplastic resin with pyromellitic dianhydride to carry out a reaction therebetween to convert the thermoplastic resin into a high molecular weight one, and this process is characterized in that the pyromellitic dianhydride has at least one of the following properties in particle form: (1) intrinsically linear or needle-like particle forms; (2) a bulk density of 0.4~0.9 g/ml; and (3) a rest angle of 50~70 degrees.

12 Claims, 3 Drawing Sheets

Fig. 1
Fig. 2
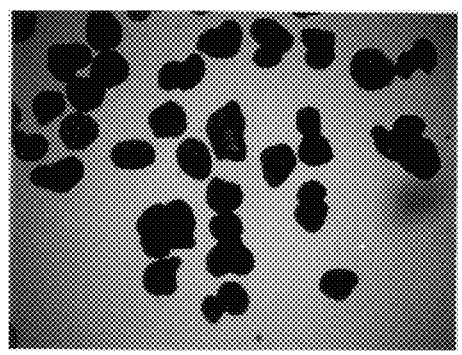

PROCESS FOR PRODUCING HIGH MOLECULAR WEIGHT THERMOPLASTIC RESIN COMPOSITION AND ITS USE

BACKGROUND OF THE INVENTION

A. Technical Field

The present invention relates to a process for producing a high molecular weight thermoplastic resin composition and its use, and more specifically, relates to: a process for producing a high molecular weight thermoplastic resin composition, which comprises the step of mixing a thermoplastic resin with a specific reforming additive to carry out a reaction therebetween; and uses of the resultant high molecular weight thermoplastic resin composition.

B. Background Art

It is generally known that it is possible to improve mechanical properties of a molded product comprising a thermoplastic resin by a process including the step of mixing the thermoplastic resin with a polyfunctional compound to carry out a reaction therebetween. Hereupon, the above polyfunctional compound is used to increase the molecular weight of the above thermoplastic resin by an addition reaction of the polyfunctional compound with a terminal group of the thermoplastic resin.

The above conventional process is especially effective in converting the thermoplastic resin into a high molecular weight one. For example, a process is reported, which comprises the step of mixing a polyester resin with an aromatic tetracarboxylic dianhydride in a melted state to carry out a reaction therebetween (e.g. JP-B-13860/1972).

In the above conventional process for the high molecular weight conversion, generally, pyromellitic dianhydride is preferably used as the aromatic tetracarboxylic dianhydride in view of such as reactivity and availability (JP-B-13860/1972, JP-A-507523/1993 and JP-B86518/1994). The high molecular weight conversion is effectively carried out by an addition reaction between the pyromellitic dianhydride and the thermoplastic resin.

However, indeed the increase of the molecular weight may be accomplished by the above conventional process, but this process might involve disadvantages in that the reproducibility of the intrinsic viscosity of the final product is poor, or in that gelation occurs in the reaction. Therefore, this conventional process is not what has sufficiently been established as a stable production process.

SUMMARY OF THE INVENTION

A. Object of the Invention

An object of the present invention is to provide a process for producing a high molecular weight thermoplastic resin composition, which can give the high molecular weight thermoplastic resin composition with good reproducibility and stably.

Another object of the present invention is to provide a molded structure, which is obtained from the high molecular weight thermoplastic resin composition obtained from the production process, as mentioned immediately above, and is excellent in the mechanical properties.

B. Disclosure of the Invention

The present inventor diligently studied to solve the above problems. As a result, he focused his attention on the chemical and physical properties of pyromellitic dianhydride used in the reaction, and then he found that the high molecular weight thermoplastic resin composition could be produced with good reproducibility and stably by a production process involving an addition reaction of a thermoplastic resin with pyromellitic dianhydride having specific particle forms (which are not conventional round or spherical ones, but, preferably, linear or needle-like ones, for example, as shown in FIG. 1) or specific physical properties.

Furthermore, the inventor found that because, as is stated above, the high molecular weight thermoplastic resin composition resultant from such a production process exhibited uniform physical properties, a molded structure obtained from this resin composition was excellent in the mechanical properties.

Thus, a process for producing a high molecular weight thermoplastic resin composition, according to the present invention, comprises the step of mixing a thermoplastic resin with pyromellitic dianhydride to carry out a reaction therebetween to convert the thermoplastic resin into a high molecular weight one, wherein the thermoplastic resin has a functional group reactable with pyromellitic dianhydride, and this process is characterized in that the pyromellitic dianhydride has intrinsically linear or needle-like particle forms.

In addition, another process for producing a high molecular weight thermoplastic resin composition, according to the present invention, comprises the step of mixing a thermoplastic resin with pyromellitic dianhydride to carry out a reaction therebetween to convert the thermoplastic resin into a high molecular weight one, wherein the thermoplastic resin has a functional group reactable with pyromellitic dianhydride, and this process is characterized in that the pyromellitic dianhydride has particle forms which are characterized by exhibiting a bulk density of 0.4~0.9 g/ml.

In addition, yet another process for producing a high molecular weight thermoplastic resin composition, according to the present invention, comprises the step of mixing a thermoplastic resin with pyromellitic dianhydride to carry out a reaction therebetween to convert the thermoplastic resin into a high molecular weight one, wherein the thermoplastic resin has a functional group reactable with pyromellitic dianhydride, and this process is characterized in that the pyromellitic dianhydride has particle forms which are characterized by exhibiting a rest angle of 50~70 degrees.

A high molecular weight thermoplastic resin composition, according to the present invention, is characterized by being obtained by any one of the above production processes according to the present invention.

In addition, a molded structure, according to the present invention, is characterized by being obtained by a process including the step of melt-molding the above high molecular weight thermoplastic resin composition according to the present invention.

These and other objects and the advantages of the present invention will be more fully apparent from the following detailed disclosure.

BRIEF DESCRIPTION OF THE DRAWINGS

FIG. 1 is a photomicrograph showing particle forms of PMDA-1.

FIG. 2 is a photomicrograph showing particle forms of PMDA-2.

DETAILED DESCRIPTION OF THE INVENTION

Figure 3:
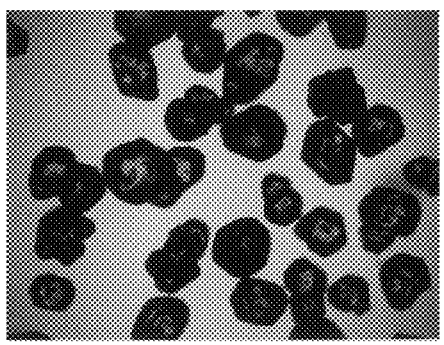
FIG. 3 is a photomicrograph showing particle forms of PMDA-3.

Hereinafter, the present invention is described in detail.

(Thermoplastic Resin):

The thermoplastic resin as used in the present invention is not especially limited if it is a thermoplastic resin having an active hydrogen group (e.g. hydroxyl group, amino group and thiol group) at a terminal thereof, such as polyester resins, polyamides, polyacetals, polycarbonates, polyphenylene ethers, and polyphenylene sulfides. However, the polyester resins are preferable, because they have a hydroxyl group that is the least colorable of the active hydrogen groups, and because uniform melt-disperse-mixing can be accomplished by bringing the melting points of the polyester resins near to that of pyromellitic dianhydride. In addition, these thermoplastic resins may be used either alone respectively or in combinations with each other.

The above polyester resin is a product from a polycondensation reaction between a dicarboxylic acid or its derivative and a diol with 2 to 12 carbon atoms. The above dicarboxylic acid or its derivative is not especially limited, but examples thereof include: phthalic acid, terephthalic acid, isophthalic acid, chloroterephthalic acid, nitroterephthalic acid, 5-sodiosulfoisophthalic acid, anhydrides of these acids, and diesters of these acids with lower alcohols, such as dimethyl esters and diethyl esters; 2,6-naphthalenedicarboxylic acid, anhydride of this acid, and diesters of this acid with lower alcohols, such as dimethyl esters and diethyl esters; and further, hexahydrophthalic acid, hexahydroterephthalic acid, adipic acid, sebacic acid, anhydrides of these acids, and diesters of these acids with lower alcohols, such as dimethyl esters and diethyl esters. Among them, particularly, terephthalic acid is preferable. The above diol is not especially limited, but examples thereof include ethylene glycol, 1,4-cyclohexanediol, and 1,4-butanediol. Among them, particularly, ethylene glycol is preferable.

Copolymers, in which units deriving from isophthalic acid or another dicarboxylic acid are substituted for up to 25 mol % of units deriving from terephthalic acid, are also included in the above polyester resins. Particularly desired is a polyalkylene terephthalate (co)polymer as produced by homopolymerization of a polyalkylene terephthalate or by copolymerization of a polyalkylene terephthalate with isophthalic acid.

Preferable examples of the above polyester resin include: poly(ethylene terephthalate) (hereinafter referred to as PET); PET having a portion as copolymerized with isophthalic acid; poly(butylene terephthalate); and poly(ethylene naphthalate). Among them, particularly, PET is preferable.
(Pyromellitic Dianhydride):

The aromatic tetracarboxylic dianhydride used for being mixed with the thermoplastic resin in the present invention is pyromellitic dianhydride.

The pyromellitic dianhydride as used in the present invention is characterized by having intrinsically linear or needle-like particle forms as observed with such as a microscope. In the case where the particle forms of the pyromellitic dianhydride are neither intrinsically linear nor needle-like, for example, in the case where they are spherical, there are disadvantages in that the reproducibility of the intrinsic viscosity of the final product is poor, or in that gelation occurs in the reaction, as is the case with the above prior arts.

As to the above pyromellitic dianhydride as used in the present invention, it is preferable that: (1) not less than 80 weight % of the pyromellitic dianhydride has particle forms which are characterized by having a length of 150 $\mu$m~1 mm and an average aspect ratio of 1.7~5 (more preferably 2~5); and/or (2) the pyromellitic dianhydride exhibits a half band width (half value) of a diffraction peak, corresponding to a (1, 1, 2) plane, in the range of 0.1~0.17 (more preferably 0.1~0.15) when analyzed by powder X-ray diffraction spectroscopy (XRD). In the case where the content of particles having forms which are characterized by having a length of 150 $\mu$m ~1 mm and an average aspect ratio of 1.7~5 in the pyromellitic dianhydride is less than 80 weight %, or where the half band width (half value) of a diffraction peak corresponding to a (1, 1, 2) plane which is exhibited in the analysis of the pyromellitic dianhydride by powder X-ray diffraction spectroscopy (XRD) is outside the range of 0.1~0.17, there are disadvantages, for example, in that the reproducibility of the intrinsic viscosity of the final product is poor, or in that gelation occurs in the reaction.

In addition, the pyromellitic dianhydride as used in the present invention is characterized by having particle forms which are characterized by exhibiting a bulk density of 0.4~0.9 g/ml. Either in the case where the bulk density is smaller than the above range (in other words, the pyromellitic dianhydride is too light) or in the case where the bulk density is larger than the above range (in other words, the pyromellitic dianhydride is too heavy), there are disadvantages in that the reproducibility of the intrinsic viscosity of the final product is poor, or in that gelation occurs in the reaction, as is the case with the above prior arts.

In addition, the pyromellitic dianhydride as used in the present invention is characterized by having particle forms which are characterized by exhibiting a rest angle of 50~70 degrees. Either in the case where the rest angle is smaller than the above range or in the case where the rest angle is larger than the above range, there are disadvantages in that the reproducibility of the intrinsic viscosity of the final product is poor, or in that gelation occurs in the reaction, as is the case with the above prior arts.

As is mentioned above, the pyromellitic dianhydride as used in the present invention is characterized by having intrinsically linear or needle-like particle forms, or by having particle forms which are characterized by exhibiting a bulk density of 0.4~0.9 g/ml, or by having particle forms which are characterized by exhibiting a rest angle of 50~70 degrees. However, the pyromellitic dianhydride is more preferably characterized by exhibiting a beginning temperature of not higher than 275° C. of an endothermic peak as assigned to its crystal melting when heat-scanned at a rate of 50° C./minute under nitrogen atmosphere with a differential scanning calorimeter. This beginning temperature of endothermic peak is an index of how fast the pyromellitic dianhydride melts to fall into a dispersed state when added to melted resins. In the case where this temperature is higher than 275° C., there are disadvantages in that the pyromellitic dianhydride is difficult to uniformly disperse after being mixed, therefore gelation is caused by a local reaction.

The process for producing the above pyromellitic dianhydride as used in the present invention is not especially limited, but preferable examples thereof include, as is disclosed in JP-A-59668/1996, a production process comprising the steps of: carrying out catalytic gas phase oxidation of a 1,2,4,5-tetraalkylbenzene with a molecular oxygen-containing gas; and depositing the resultant pyromellitic dianhydride in a condenser. The pyromellitic dianhydride obtained by this production process has the advantage of containing a smaller amount of impurities, derived from such as solvents and oxidants, than those produced by conventional liquid phase oxidation processes. In addition, because pyromellitic dianhydride is obtained not by way of pyromellitic acid, but directly, there is another advantage in that the pyromellitic acid can be inhibited from being contained as an impurity. Particularly, there are, for example, advantages of low contents of hydrous substances, such as pyromellitic monoanhydride and pyromellitic acid, as derived from such as the presence of aqueous solvents. Therefore, the resultant pyromellitic dianhydride is more favorable for being used for the present invention production process.

Furthermore, even if a process (such as liquid phase oxidation process) other than the above catalytic gas phase oxidation process is used, the pyromellitic dianhydride as used in the present invention can be produced, for example, by subliming and then depositing the resultant pyromellitic dianhydride. The conditions therefor are fitly modifiable and adjustable.

In addition, the pyromellitic dianhydride, as used in the present invention, has high purity preferably for sufficiently displaying the effects and advantages of the present invention. The purity of the pyromellitic dianhydride is, for example, preferably not lower than 99.3 weight %, more preferably not lower than 99.7 weight %.

The amount of the above pyromellitic dianhydride, as used, is preferably in the range of 0.1 to 5 weight % of the thermoplastic resin. However, even in the concentration lower or higher than this range, the pyromellitic dianhydride is usable.

(Mixing and Reaction):

In the production process according to the present invention, the above thermoplastic resin is mixed with the above pyromellitic dianhydride to carry out a reaction therebetween, when a reinforcing fiber can be added to the mixture. In this case, the amount of the reinforcing fiber as added is in the range of 5 to 200 weight parts per 100 weight parts of the thermoplastic resin. The kind of the reinforcing fiber is not especially limited, but examples thereof include glass fibers, carbon fibers, polyamide fibers, and metal fibers. Particularly, the glass fibers are preferably used. In addition, additives can be added to the mixture, if necessary. Examples of the additives include fillers, nucleating agents, crystallization promoters, plasticizers, antioxidants, stabilizers, fire retardants, and mold-release agents. Among them, particularly, the nucleating agents such as talc are frequently added.

The above mixing step can be carried out with apparatuses such as single- or twin-screw extruders, kneaders, Banburry mixers, mixing rollers, and conventional reaction vessels, but is preferably carried out by melt-disperse-mixing with the twin-screw extruder. This twin-screw extruder is not especially limited, but examples thereof include a co-rotating intermeshing twin-screw extruder with vents, a co-rotating non-intermeshing twin-screw extruder with vents, a counter-rotating intermeshing twin-screw extruder with vents, a counter-rotating non-intermeshing twin-screw extruder with vents, a co-rotating intermeshing twin-screw extruder with no vent, a co-rotating non-intermeshing twin-screw extruder with no vent, a counter-rotating intermeshing twin-screw extruder with no vent, and a counter-rotating non-intermeshing twin-screw extruder with no vent. Among them, various twin-screw extruders are preferable for dispersibility. Furthermore, the temperature of the above step is different in accordance with the melting point of the polymer or copolymer as used, but is usually preferably in the range of 200 to 350° C. In addition, this temperature is more preferably in the range of 250 to 310° C. when using polyester resins such as PET.

In the present invention, supply of such as pyromellitic dianhydride and other additives can be carried out with conventional feeders such as vibratory feeders and screw feeders, but there is no especial limitation thereto.

The residence time in the above extruder is variable in accordance with the kind of the polymer or copolymer as used, and is not especially limited, but is usually often in the range of 10 to 180 seconds. However, in the case where a polyester resin is used in order to carry out a solid-state polyaddition reaction, the residence time is preferably shorter than the above range, specifically, the residence time is preferably in the range of 10 to 120 seconds, more preferably 15 to 30 seconds.

If the pyromellitic dianhydride as defined in the present invention is used in the above mixing and reaction, then the aforementioned disadvantages, such that the reproducibility of the intrinsic viscosity of the final product is poor, or that gelation occurs in the next reaction, can be removed. In addition, such effects favorably become greater due to the great enhancement of the mixing effects and the shortening of the residence time by the melt-disperse-mixing with the above twin-screw extruder.

Because the pyromellitic dianhydride as defined in the present invention has the specific particle forms, the feedability thereof to the twin-screw extruder is good. That is to say, the pyromellitic dianhydride of the linear or needle-like particle form as defined in the present invention is preferably used in order to carry out the present invention, because it is easy to uniformly supply such pyromellitic dianhydride into the twin-screw extruder when feeding the pyromellitic dianhydride. In addition, the pyromellitic dianhydride of the linear or needle-like particle form as defined in the present invention is preferably used also in respect to uniform mixability and uniform dispersibility when adding the pyromellitic dianhydride to a heat-melting reactor such as twin-screw extruder. As a result, for example, the use of the pyromellitic dianhydride of the linear or needle-like particle form as defined in the present invention can inhibit the intrinsic viscosity of thermoplastic resins, as converted into high molecular weight ones, from scattering. Therefore, the use of the pyromellitic dianhydride of the linear or needle-like particle form as defined in the present invention enables the high molecular weight conversion to be carried out more uniformly than the use of pyromellitic dianhydride having particle forms as not defined in the present invention, such as round ones.

The state of the reaction mixture, as obtained by the above reaction, is not especially limited, but is preferably in the form of pellets. When the twin-screw extruder is used in the above mixing step, the above mixture is extruded from the extruder into the form of strands (diameter=preferably 1 to 10 mm, more preferably 3 to 5 mm), and then pelletized by cutting (into the length of preferably 1 to 20 mm, more preferably 2 to 10 mm) with a pelletizer, thus obtaining pellets.

In the present invention, the molecular weight may be further increased by carrying out a solid-state polyaddition reaction of the reaction mixture of the above thermoplastic resin and pyromellitic dianhydride. Particularly, in the case where a polyester resin is used as the thermoplastic resin, it is preferable to carry out the solid-state polyaddition reaction. In this case, as is mentioned above, it is preferable that the mixture is in the form of pellets. The use of such a pelletized mixture has the economical advantage of needing no large reaction space. The solid-state polyaddition reaction is carried out by heating the mixture in the range of 180 to 230° C. either under an inert gas current of normal pressure, or under reduced pressure, in a solid-state polyaddition reactor. The above inert gas current or reduced pressure effectively removes volatile components or water from the above mixture.

The above production process according to the present invention gives a high molecular weight thermoplastic resin composition including a thermoplastic resin having an increased molecular weight that is from 1.5 to tens of times as large as that of its original resin. In the case of PET, for example, the intrinsic viscosity of the high molecular weight thermoplastic resin composition can be increased to at least 0.5 dl/g, preferably at least 0.6 dl/g.

In addition, the high molecular weight thermoplastic resin composition, obtained by the production process according to the present invention, can be utilized for various uses. For example, in the case where the high molecular weight thermoplastic resin composition is a product by converting a polyester resin into a high molecular weight one, this composition can be formed into various molded products such as PET bottles and cases, or be mixed with such as foaming agents to produce foamed PET. In addition, this composition can be melt-spun to produce such as polyester fibers and yarn. Furthermore, this composition can be mixed with reinforcing fibers, such as glass fibers and carbon fibers, to produce fiber-reinforced materials (such as glass fiber-reinforced polyesters).

Because the high molecular weight thermoplastic resin composition obtained by the production process according to the present invention can be converted into a high molecular weight one in a more uniform state, this composition is excellent in mechanical properties and, for example, can achieve uniform high molecular weight conversion and a uniformly foamed state, and can be utilized favorably for various uses as typified by the above.

(Molded Structure)

The molded structure comprising the high molecular weight thermoplastic resin composition according to the present invention is a product by a process including the step of melt-molding the above composition, preferably, under molding temperature conditions of not lower than the melting temperature of the above composition, and more preferably the molding temperature conditions are set in the range of from the melting temperature of the above composition to a temperature higher than this melting temperature by 30° C. The molding method is not especially limited, but preferable examples thereof include injection molding, injection-compression molding, blow molding, extrusion molding, foam molding, and melt spinning molding.

(Effects and Advantages of the Invention)

The process for producing a high molecular weight thermoplastic resin composition, according to the present invention, can give the high molecular weight thermoplastic resin composition with good reproducibility and stably.

Furthermore, the molded structure according to the present invention, which is obtained from the high molecular weight thermoplastic resin composition obtained from the above production process according to the present invention, is excellent in the mechanical properties.

Derailed Description of the Preferred Embodiments

Hereinafter, the present invention is more specifically illustrated by the following examples of some preferred embodiments in comparison with comparative examples not according to the invention. However, the invention is not limited to the below-mentioned examples. Incidentally, unless otherwise noted, the physical properties were measured under conditions of temperature=23±2° C., relative humidity=50±5 %.

(Preparation of Pyromellitic Dianhydride)

Figure 4:
FIG. 4 is a photomicrograph showing particle forms of PMDA-4.

Physical properties of four kinds of pyromellitic dianhydrides (PMDA-1~4), used in the Examples and the Comparative Examples, are listed in Table 1. In addition, photomicrographs of these pyromellitic dianhydrides are shown in FIG. 1 (PMDA-1), FIG. 2 (PMDA-2), FIG. 3 (PMDA-3) and FIG. 4 (PMDA-4), respectively.

TABLE 1

|  | PMDA-1 | PMDA-2 | PMDA-3 | PMDA-4 |
|---|---|---|---|---|
| Purity (wt %) | 99.7 | 99.7 | 99.6 | 99.8 |
| Melting point (° C.) | 286 | 286 | 286 | 286 |
| Acid value (KOH mg/g) | 1030 | 1030 | 1030 | 1028 |
| Particle form | Linear (needle-like) | Spherical | Spherical | Spherical |
| Weight ratio (wt %) of particles having a length of 150 µm to 1 mm | 85 | 99 | 80 | 99 |
| Aspect ratio | 2.97 | 1.28 | 1.42 | 1.40 |
| Half band width (half value) of XRD peak | 0.141 | 0.188 | 0.259 | 0.212 |
| Bulk density (g/ml) | 0.78 | 0.95 | 0.88 | 0.99 |
| Rest angle (degrees) | 56 | 40 | 40 | 37 |
| Beginning temperature of endothermic peak (° C.) | 273 | 282 | 286 | 273 |

In Table 1, the melting point of pyromellitic dianhydride was measured by heat-scanning about 10 mg of sample at a rate of 10° C./minute under nitrogen atmosphere with a differential scanning calorimeter (DSC-50, made by Shimadzu Corporation).

The acid value was measured in an aqueous solution with an automatic titrator (APB-410) made by Kyoto Denshi.

The particle form was judged from photomicrographs with the eye (refer to FIGS. 1~4).

The weight ratio of particles having a length of 150 µm to 1 mm in the entirety of pyromellitic dianhydride was calculated by sieving out pyromellitic dianhydride with a 100-mesh standard sieve according to Japanese Industrial Standards.

In addition, 0.1 mg of pyromellitic dianhydride of which the above weight ratio of particles having a length of 150 µm to 1 mm in the entirety of pyromellitic dianhydride was not less than 80 weight % was observed with an optical microscope of 20 magnifications to determine the aspect ratio of each particle and then arithmetically average it.

The half band width (half value) of a diffraction peak corresponding to a (1, 1, 2) plane as exhibited in the analysis by powder X-ray diffraction spectroscopy (XRD) was determined from a peak which was measured by the following steps of: placing the sample (pyromellitic dianhydride) (as not yet pulverized) into an aluminum-made cell (size=50 mm×35 mm×1.6 mm, space to contain the sample=18 mm×20 mm×1.6 mm); and then fitting the cell to an XRD apparatus (RINT2400 Wide Angle Goniometer, made by Rigaku Corporation) by light pressing with fingers on which a polyethylene-made glove was put; and then measuring the peak under the following conditions:

(Measurement Conditions)

| X-ray | Cu-Kα1 (40 kV, 50 mA) |
|---|---|
| Divergent slit | ½ degrees |
| Scattering slit | ½ degrees |
| Light-receiving slit | 0.3 mm |
| Scanning speed | 7.000°/min |
| Scanning axis | 2θ/θ |

The bulk density was measured with a cup of the capacity of 100 ml in accordance with JIS K3362.

Figure 5:
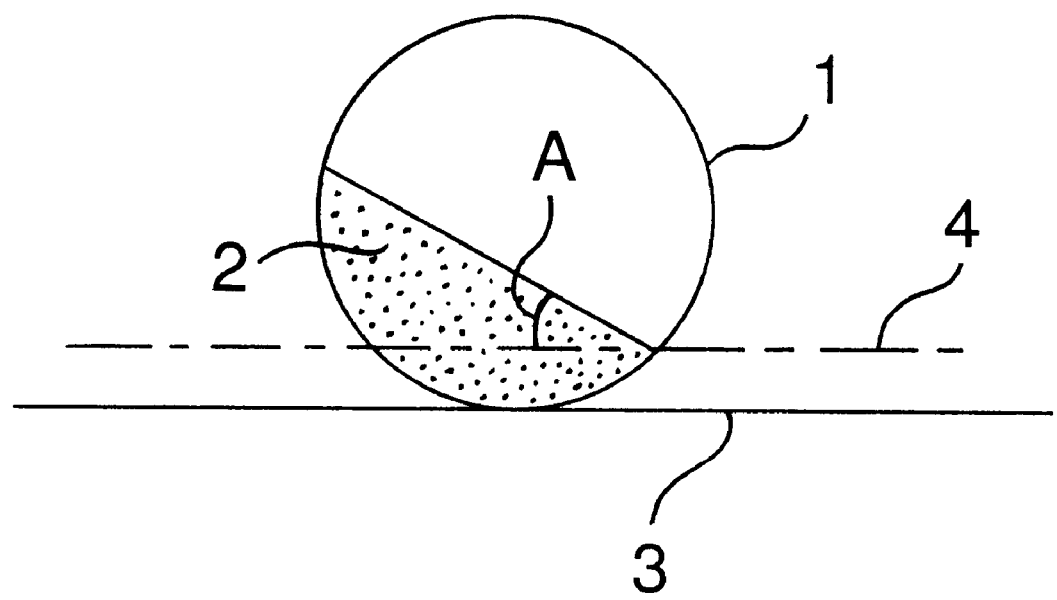
FIG. 5 is a schema showing a portion for measuring the rest angle.

The rest angle was measured by: placing the sample into a mayonnaise bottle (which could contain 800 g of mayonnaise), and then rotating this bottle slowly. Specifically, as is shown in FIG. 5, about ⅓~about ½ of the capacity of a mayonnaise bottle 1 (which could contain 800 g of mayonnaise) was filled with the sample 2, and the bottle 1 was capped and then laid down and slowly rotated (rolled) (at a rate of 1 rotation/2~3 seconds) on a stand 3, when the formed mound of the sample 2 was observed to measure the angle A between the slope of the mound and a horizontal line 4 as the rest angle. In addition, as the need arose (for example, in the case where the slope of the mound had unevenness), the average of a plurality of measurement results was taken as the measured value.

The melt beginning temperature was measured by heat-scanning 5 mg±0.3 mg of sample at a rate of 50° C./minute under nitrogen atmosphere with a differential scanning calorimeter (DSC-50, made by Shimadzu Corporation) using an aluminum-made seal sample pan (SSC 000C008) (made by Seiko Electronic Industries Co., Ltd.) as a cell to determine the beginning temperature of endothermic peak, as assigned to crystal melting, from its connective intersection with the base line.

(Measurement of Intrinsic Viscosity)

In the case where poly(ethylene terephthalate) (PET) or poly(butylene terephthalate) (PBT) was used as the thermoplastic resin, the intrinsic viscosity was measured at 25° C. in a mixed solvent of phenol/tetrachloroethane=6/4 and taken as an index of molecular weight.

(Measurement of Melt Index)

In the case where polycarbonate (PC) was used as the thermoplastic resin, the melt index was measured according to JIS K7210 with a melt indexer (made by Shimadzu Corporation) and taken as an index of molecular weight. The test temperature was 300° C., and the load was 1.2 kg.

(Measurement of Mechanical Properties)

A test piece was produced by molding the obtained resin composition under conditions of cylinder temperature=290° C., temperature of mold=130° C., and molding cycle=30 seconds with a screw-type injection molding machine of 35 t in stamping power. As to the resultant test piece, the flexural strength and the flexural modulus were measured according to ASTM D790, the tensile strength and the elongation were measured according to ASTM D638. and the impact strength was measured according to ASTM D256.

EXAMPLE 1

PET (intrinsic viscosity: 0.6 dl/g) (as the thermoplastic resin) and PMDA-1 (as the pyromellitic dianhydride) were melt-disperse-mixed with a 30 mm co-rotating intermeshing twin-screw extruder in accordance with the mixing ratios and the temperature conditions of Table 2. From the observation of PMDA-1 being fed, it was found that PMDA-1 was uniformly added into the extruder, therefore the feedability of PMDA-1 was good. Thereafter, strands were extruded from a die of the extruder, when the thickness of the extruded strands was uniform. The extruded strands were cooled in water and then pelletized with a strand cutter, thus obtaining pellets, which had an intrinsic viscosity of 0.75 dl/g. In addition, whichever portion of the resultant pellets might be sampled, it exhibited a uniform numerical value of measured intrinsic viscosity. The obtained results are shown in Table 2.

into the extruder, therefore the feedability of PMDA-1 was good. The resultant pellets had an intrinsic viscosity of 0.82 dl/g as shown in Table 2. In addition, whichever portion of the resultant pellets might be sampled, it exhibited a uniform numerical value of measured intrinsic viscosity.

EXAMPLE 3

The procedure was carried out in the same way as of Example 1 except that: PC (melt index: 22 g/10 minutes) was used as the thermoplastic resin; and the mixing temperature was 310° C. From the observation of PMDA-1 being fed, it was found that PMDA-1 was uniformly added into the extruder, therefore the feedability of PMDA-1 was good. The resultant pellets had a melt index of 15 g/ 10 minutes as shown in Table 2. In addition, whichever portion of the resultant pellets might be sampled, it exhibited a uniform numerical value of measured melt index.

EXAMPLE 4

PET (intrinsic viscosity: 0.6 dl/g) (as the thermoplastic resin) and PMDA-1 (as the pyromellitic dianhydride) were melt-disperse-mixed with a 30 mm counter-rotating intermeshing twin-screw extruder in accordance with the mixing ratios and the temperature conditions of Table 2. From the observation of PMDA-1 being fed, it was found that PMDA-1 was uniformly added into the extruder, therefore the feedability of PMDA-1 was good. Thereafter, strands were extruded from a die of the extruder, when the thickness of the extruded strands was uniform. The extruded strands were cooled in water and then pelletized with a strand cutter, thus obtaining pellets. The obtained pellets were subjected to a quality-improving treatment by a solid-state polyaddition reaction under the conditions of Table 2 to increase the intrinsic viscosity of the pellets. The resultant pellets had an intrinsic viscosity of 0.85 dl/g. In addition, whichever por-

TABLE 2

| | Example | | | | | | Comparative Example | | | | |
|---|---|---|---|---|---|---|---|---|---|---|---|
| | 1 | 2 | 3 | 4 | 5 | 6 | 1 | 2 | 3 | 4 | 5 |
| Extrusion rate (kg/hr) | 15 | 15 | 15 | 30 | 30 | 43 | 15 | 15 | 15 | 30 | 43 |
| Kind of PMDA[1] | 1 | 1 | 1 | 1 | 1 | 1 | 2 | 3 | 4 | 2 | 2 |
| Mixing ratios | | | | | | | | | | | |
| PET | 100 | — | — | 100 | 100 | 70 | 100 | 100 | 100 | 100 | 70 |
| PBT | — | 100 | — | — | — | — | — | — | — | — | — |
| PC | — | — | 100 | — | — | — | — | — | — | — | — |
| PMDA | 0.36 | 0.36 | 0.36 | 0.36 | 0.6 | 0.25 | 0.36 | 0.36 | 0.36 | 0.36 | 0.25 |
| Glass fiber | — | — | — | — | — | 30 | — | — | — | — | 30 |
| Talc | — | — | — | — | — | 0.7 | — | — | — | — | 0.7 |
| Mixing apparatus[2] | Co-rotating | Co-rotating | Co-rotating | Counter-rotating | Counter-rotating | Counter-rotating | Co-rotating | Co-rotating | Co-rotating | Counter-rotating | Counter-rotating |
| Mixing temperature (° C.) | 300 | 260 | 310 | 300 | 300 | 300 | 300 | 300 | 300 | 300 | 300 |
| Solid-state polyaddition reaction | None | None | None | Carried out | Carried out | Carried out | None | None | None | Carried out | Carried out |
| Reaction temperature (° C.) | — | — | — | 220 | 220 | 220 | — | — | — | 220 | 220 |
| Reaction time (hr) | — | — | — | 6 | 6 | 6 | — | — | — | 6 | 6 |
| Intrinsic viscosity (dl/g) | 0.75 | 0.82 | — | 0.85 | 1.02 | 0.80 | Gel | Gel | Gel | 0.60 ~ 0.85 | 0.58 ~ 0.82 |
| Melt index (g/10 min) | — | — | 15 | — | — | — | — | — | — | — | — |

[1]1: PMDA-1, 2: PMDA-2, 3: PMDA-3, 4: PMDA-4
[2]Co-rotating: 30 mm co-rotating intermeshing twin-screw extruder
Counter-rotating: 30 mm counter-rotating intermeshing twin-screw extruder

EXAMPLE 2

The procedure was carried out in the same way as of Example 1 except that: PBT (intrinsic viscosity: 0.75 dl/g) was used as the thermoplastic resin; and the mixing temperature was 260° C. From the observation of PMDA-1 being fed, it was found that PMDA-1 was uniformly added tion of the resultant pellets might be sampled, it exhibited a uniform numerical value of measured intrinsic viscosity. The obtained results are shown in Table 2.

EXAMPLE 5

The procedure was carried out in the same way as of Example 4 except that the mixing ratios of raw materials were changed as shown in Table 2. From the observation of PMDA-1 being fed, it was found that PMDA-1 was uniformly added into the extruder, therefore the feedability of PMDA-1 was good. The resultant pellets had an intrinsic viscosity of 1.02 dl/g as shown in Table 2. In addition, whichever portion of the resultant pellets might be sampled, it exhibited a uniform numerical value of measured intrinsic viscosity.

EXAMPLE 6

The procedure was carried out in the same way as of Example 4 except that: glass fibers (chopped strands CS 3J-941, made by Nitto Boseki Co., Ltd., fiber diameter=10 μm, fiber length=3 mm) and a nucleating agent (LMP-100, made by Fuji Talc Co., Ltd.) were added to raw materials; and the mixing ratios were changed as shown in Table 2. From the observation of PMDA-1 being fed, it was found that PMDA-1 was uniformly added into the extruder, therefore the feedability of PMDA-1 was good. The resultant pellets had an intrinsic viscosity of 0.80 dl/g as shown in Table 2. In addition, whichever portion of the resultant pellets might be sampled, it exhibited a uniform numerical value of measured intrinsic viscosity.

EXAMPLE 7

A test piece for comparing the mechanical properties was produced with an injection molding machine of 35 t in stamping power from the pellets of the product of Example 6. The flexural strength, the flexural modulus, the tensile fracture strength, the elongation, and the Izod impact strength of this test piece were measured according to JIS. The obtained results are shown in Table 3.

TABLE 3

|  | Example 7 | Comparative Example 6 |
|---|---|---|
| Flexural strength (kg/mm$^2$) | 24.0 | 22.0 |
| Flexural modulus (kg/mm$^2$) | 1000 | 950 |
| Tensile fracture strength (kg/mm$^2$) | 175 | 155 |
| Elongation (%) | 3.0 | 2.5 |
| Izod impact strength (kgcm/cm$^2$) | 8 | 8 |

Comparative Example 1

The procedure was carried out in the same way as of Example 1 except that PMDA-2 was used as the pyromellitic dianhydride. From the observation of PMDA-2 being fed, it was found that PMDA-2 was not uniformly added into the extruder. In addition, an attempt was made to dissolve the resultant pellets into the mixed solvent of phenol/tetrachloroethane in order to measure the intrinsic viscosity, but the pellets were in the form of gel and therefore did not entirely dissolve.

Comparative Example 2

The procedure was carried out in the same way as of Example 1 except that PMDA-3 was used as the pyromellitic dianhydride. From the observation of PMDA-3 being fed, it was found that PMDA-3 was not uniformly added into the extruder. In addition, an attempt was made to dissolve the resultant pellets into the mixed solvent of phenol/tetrachloroethane in order to measure the intrinsic viscosity, but the pellets were in the form of gel and therefore did not entirely dissolve.

Comparative Example 3

The procedure was carried out in the same way as of Example 1 except that PMDA-4 was used as the pyromellitic dianhydride. From the observation of PMDA-4 being fed, it was found that PMDA-4 was not uniformly added into the extruder. In addition, an attempt was made to dissolve the resultant pellets into the mixed solvent of phenol/tetrachloroethane in order to measure the intrinsic viscosity, but the pellets were in the form of gel and therefore did not entirely dissolve.

Comparative Example 4

The procedure was carried out in the same way as of Example 4 except that PMDA-2 was used as the pyromellitic dianhydride. From the observation of PMDA-2 being fed, it was found that PMDA-2 was not uniformly added into the extruder. In addition, the strands were wavy and did not have a uniform thickness. Furthermore, the resultant pellets had intrinsic viscosities scattering between 0.60 and 0.85 dl/g.

Comparative Example 5

The procedure was carried out in the same way as of Example 4 except that: glass fibers (chopped strands CS 3J-941, made by Nitto Boseki Co., Ltd., fiber diameter=10 μm, fiber length=3 mm) and a nucleating agent (LMP-100, made by Fuji Talc Co., Ltd.) were added to raw materials; PMDA-2 was used as the pyromellitic dianhydride; and the mixing ratios were changed as shown in Table 2. From the observation of PMDA-2 being fed, it was found that PMDA-2 was not uniformly added into the extruder. In addition, the strands were wavy and did not have a uniform thickness. Furthermore, the resultant pellets had intrinsic viscosities scattering between 0.58 and 0.82 dl/g.

Comparative Example 6

A test piece for comparing the mechanical properties was produced with an injection molding machine of 35 t in stamping power from the pellets of the product of Comparative Example 5. The flexural strength, the flexural modulus, the tensile fracture strength, the elongation, and the Izod impact strength of this test piece were measured according to JIS. The obtained results are shown in Table 3.

Example 8

The PET resins were converted into high molecular weight ones with the same extruders and under the same mixing conditions as of Examples 1 and 4 respectively except that PMDA-1 (pyromellitic dianhydride) was replaced with PMDA-5 (pyromellitic dianhydride) having the following physical properties: purity=99.8 wt %; melting point=285° C.; acid value=1,029 KOHmg/g; particle form= linear (needle-like); weight ratio of particles having a length of 150 μm to 1 mm=83 wt %; aspect ratio=4.0; half band width (half value) of XRD peak=0.16; bulk density=0.6 g/ml; rest angle=60 degrees; beginning temperature of endothermic peak=275° C. The resultant high molecular weight PET resins had intrinsic viscosities (IV) of 0.76 dl/g and 0.87 dl/g respectively. Incidentally, the feeding conditions were also the same as of Examples 1 and 4. As a result, from the same observation of PMDA-5 as that of PMDA-1 being fed, it was found that PMDA-5 was also uniformly added into the extruder, therefore the feedability of PMDA-5 was good. Thereafter, strands were extruded from a die of the extruder in the same ways as of Examples 1 and 4, when the thickness of the extruded strands was uniform in both cases. In addition, the extruded strands were pelletized in the same ways as of Examples 1 and 4. Whichever portion of the resultant pellets might be sampled, it exhibited a uniform numerical value of measured intrinsic viscosity.

Next, glass fiber-reinforced PET pellets were produced in the same way as of Example 6 except that PMDA-5 was used as the pyromellitic dianhydride. The resultant glass fiber-reinforced PET pellets had an intrinsic viscosity (IV) of 0.81 dl/g. In addition, the feedability of PMDA-5 was also good similarly to Example 6 and, whichever portion of the resultant pellets might be sampled, it exhibited a uniform numerical value of measured intrinsic viscosity. In addition, the glass fiber-reinforced PET pellets were molded under the same conditions as of Example 7 to measure the physical properties of the resultant molded structure. As a result, the molded structure exhibited the following properties: flexural strength=24.5 kg/mm$^2$; flexural modulus=1,050 kg/mm$^2$; tensile fracture strength=185 kg/mm$^2$; elongation=3.2%; Izod impact strength=8 kgcm/cm$^2$. Thus, these properties are as good mechanical properties as those in Example 7.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A process for producing a high molecular weight thermoplastic resin composition, which comprises the step of mixing a thermoplastic resin with pyromellitic dianhydride to carry out a reaction therebetween to convert the thermoplastic resin into a high molecular weight one, wherein the thermoplastic resin has a functional group reactable with pyromellitic dianhydride;

with the process being characterized in that the pyromellitic dianhydride has intrinsically linear or needle-like particle forms, wherein not less than 80 weight % of the pyromellitic dianhydride has particle forms which are characterized by having a length of 150 µm~1 mm and an average aspect ratio of 1.7~5.

2. A process according to claim 1 which further comprises the pyromellitic dianhydride production steps of:

carrying out catalytic gas phase oxidation of a 1,2,4,5-tetraalkylbenzene with a molecular oxygen-containing gas; and depositing the resultant pyromellitic dianhydride in a condenser.

3. A process according to claim 1, wherein the thermoplastic resin is a polyester resin.

4. A process for producing a high molecular weight thermoplastic resin composition, which comprises the step of mixing a thermoplastic resin with pyromellitic dianhydride to carry out a reaction therebetween to convert the thermoplastic resin into a high molecular weight one, wherein the thermoplastic resin has a functional group reactable with pyromellitic dianhydride;

with the process being characterized in that the pyromellitic dianhydride has intrinsically linear or needle-like particle forms, wherein the pyromellitic dianhydride exhibits a half band width (half value) of a diffraction peak, corresponding to a (1, 1, 2) plane, in the range of 0.1~0.17 when analyzed by powder X-ray diffraction spectroscopy (XRD).

5. A process for producing a high molecular weight thermoplastic resin composition, which comprises the step of mixing a thermoplastic resin with pyromellitic dianhydride to carry out a reaction therebetween to convert the thermoplastic resin into a high molecular weight one, wherein the thermoplastic resin has a functional group reactable with pyromellitic dianhydride;

with the process being characterized in that the pyromellitic dianhydride has intrinsically linear or needle-like particle forms, wherein the pyromellitic dianhydride exhibits a beginning temperature of not higher than 275° C. of an endothermic peak as assigned to its crystal melting when heat scanned at a rate of 50° C./minute under nitrogen atmosphere with a differential scanning calorimeter.

6. A process for producing a high molecular weight thermoplastic resin composition, which comprises the step of mixing a thermoplastic resin with pyromellitic dianhydride to carry out a reaction therebetween to convert the thermoplastic resin into a high molecular weight one, wherein the thermoplastic resin has a functional group reactable with pyromellitic dianhydride;

with the process being characterized in that the pyromellitic dianhydride has intrinsically linear or needle-like particle forms which are characterized by exhibiting a bulk density of 0.4~0.9 g/ml and exhibits a beginning temperature of not higher then 275° C. of an endothermic peak as assigned to its crystal melting when heat-scanned at a rate of 50° C./minute under nitrogen atmosphere with a differential scanning calorimeter.

7. A process according to claim 6, which further comprises the pyromellitic dianhydride production steps of:

carrying out catalytic gas phase oxidation of a 1,2,4,5-tetraalkylbenzene with a molecular oxygen-containing gas; and depositing the resultant pyromellitic dianhydride in a condenser.

8. A process according to claim 6, wherein the thermoplastic resin is a polyester resin.

9. A process for producing a high molecular weight thermoplastic resin composition, which comprises the step of mixing a thermoplastic resin with pyromellitic dianhydride to carry out a reaction therebetween to convert the thermoplastic resin into a high molecular weight one, wherein the thermoplastic resin has a functional group reactable with pyromellitic dianhydride;

with the process being characterized in that the pyromellitic dianhydride has particle forms which are characterized by exhibiting a rest angle of 50~70 degrees.

10. A process according to claim 9, wherein the pyromellitic dianhydride exhibits a beginning temperature of not higher than 275° C. of an endothermic peak as assigned to its crystal melting when heat-scanned at a rate of 50° C./minute under nitrogen atmosphere with a differential scanning calorimeter.

11. A process according to claim 9, which further comprises the pyromellitic dianhydride production steps of:

carrying out catalytic gas phase oxidation of a 1,2,4,5-tetraalkylbenzene with a molecular oxygen-containing gas; and depositing the resultant pyromellitic dianhydride in a condenser.

12. A process according to claim 9, wherein the thermoplastic resin is a polyester resin.

* * * * *